United States Patent [19]

Ushioda et al.

[11] 3,979,301

[45] Sept. 7, 1976

[54] IMMERSION OIL FOR MICROSCOPY

[75] Inventors: Katsuyoshi Ushioda, Tokyo; Toshikatsu Nishioka; Hiroshi Okada, both of Chiba, all of Japan

[73] Assignee: Idemitsu Petrochemical Co., Ltd., Tokyo, Japan

[22] Filed: June 17, 1975

[21] Appl. No.: 587,693

[52] U.S. Cl. ................................. 252/1; 350/179
[51] Int. Cl.² ........................................ C09K 3/00
[58] Field of Search ....................... 252/1; 350/179

[56] References Cited
UNITED STATES PATENTS 3,497,562  2/1970  Levins ........................... 350/179 X

*Primary Examiner*—Leland A. Sebastian
*Attorney, Agent, or Firm*—Armstrong, Nikaido & Wegner

[57] ABSTRACT

An immersion oil for microscopy is produced by blending 10 to 90 parts by weight of chain hydrocarbon having 200 to 5,000 of molecular weight and 10 to 90 parts by weight of specific diphenylmethane derivatives or bis($\alpha$-alkylbenzyl) alkylbenzene derivatives or 2,4-diphenyl-4-dimethylphenylbutane derivatives.

The product obtained has excellent values in the various properties such as light dispersion, refractive index, viscosity and the like. Furthermore, it has an excellent advantage that the properties such as Abbe's number and the like are easily adjustable.

5 Claims, No Drawings

IMMERSION OIL FOR MICROSCOPY

This invention relates to an immersion oil used for a microscope. More particularly, this invention pertains to an immersion oil used for a microscope which comprises 10 to 90 parts by weight of chain hydrocarbon having 200 to 5,000 of molecular weight and 10 to 90 parts by weight of specific diphenylmethane derivatives or bis-($\alpha$-alkylbenzyl) alkylbenzene derivatives on 2,4-diphenyl-4-dimethylphenyl-butane derivatives.

There has heretofore been widely known Cedar oil and Cargille oil as an immersion oil used for microscope. Cedar oil, which dissolves sugi oil (Japan cedar oil) into toluene, has disadvantage that toluene, the solvent, gradually volatilizes and diffuses to change the optical properties when it is used for an immersion oil for microscopy and, further, it is oxidized by contact with air and polymerizes to solidify gradually. In the other hand, Cargille oil has disadvantage that it has the toxicity affecting the human body caused by a large amount of poly chlorinated biphenyl (PCB) contained in the oil.

Hereupon, an immersion oil for microscopy in this invention does not have the disadvantages of the conventional immersion oils for microscopy and, in the concrete, comprises 10 to 90 parts by weight of chain hydrocarbon having 200 to 5,000 of molecular weight and 10 to 90 parts by weight of at least one compound selected from the compounds of the following general formula (1), (2), (3):

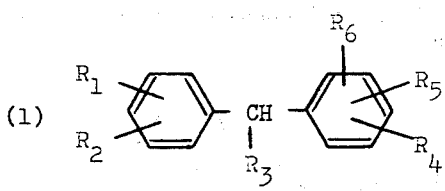

where $R_1$ to $R_5$ are hydrogen or alkyl group having from 1 to 2 carbon atoms and $R_6$ is hydrogen or alkyl group having from 1 to 4 carbon atoms and the total carbon number of $R_1$ to $R_6$ is from 0 to 5; and

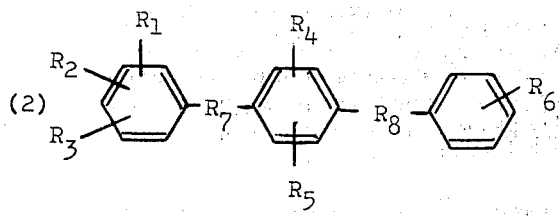

where $R_1$ to $R_3$ are hydrogen or alkyl group having from 1 to 4 carbon atoms and the total carbon atoms of $R_1$ to $R_3$ is from 0 to 4 and $R_4$ to $R_6$ are hydrogen or methyl group and $R_7$ to $R_8$ are alkylene group having from 1 to 3 carbon atoms or methylene group; and,

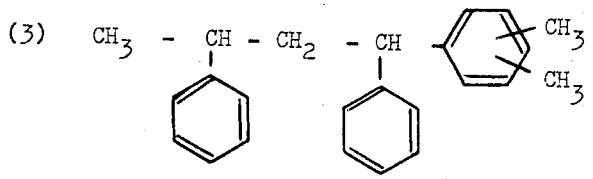

As the chain hydrocarbon having 200 to 5,000 of molecular weight, the first component of the immersion oil for microscopy used in this invention, there are, for example, liquid paraffin, liquid polybutene, liquid polyisobutylene, liquid polypropylene or the mixtures of the above-mentioned compounds and the like.

As the compounds represented with the general formula (1) in the second component of the immersion oil for microscopy used in this invention, there are, for example, diphenylmethane, 1-phenyl-1-P-tolylethane, 1-phenyl-1-(3,4-dimethyl phenylethane or the various isomers of the above-mentioned compounds and the like.

Hereupon, diphenylmethane derivatives to be not applicable to the general formula (1) cannot be used because their physical properties, in particular, the optical properties are inadequate to the component of the immersion oil in this invention.

Further, as the compounds represented with the general formula (2) in the second component used in this invention, there are, for example, 1,3-bis($\alpha$-methylbenzyl) toluene, 1,2-bis ($\alpha$-methylbenzyl)-4,5-dimethylbenzene, 1-$\alpha$-methylbenzyl-3$\alpha'$-methyl-(3,4-dimethylbenzyl)-4,5-dimethylbenzene or the various isomers of the above-mentioned compounds and the like. Bis ($\alpha$-alkylbenzyl) alkylbenzene derivatives to be not applicable to the general formula (2) cannot be used because the optical properties are inadequate to the component of the immersion oil for microscopy.

Furthermore, the compounds represented with the general formula (3) in the second component used in this invention are, as above-mentioned, 2,4-diphenyl-4-(3,4-dimethylphenyl) butane and their isomers.

These compounds of the second component represented with the general formula from (1) to (3) may be used by oneself respectively, or by the mixture of an optional ratio.

As to an immersion oil, it is required to have a excellent value in the properties such as, at least, light dispersion, refractive index and viscosity. Hereupon, the quality of light dispersion can be indicated with Abbe's number, and the value within the rauge of 40 to 50 is good and, in particular, the value of about 45 is most superior.

As the refractive index value of light, equality or approximation to that value of an object glass of microscope is required. The refractive index used of an object glass of microscope is generally 1.5 to 1.6 and the most value used is 1.515. Therefore, as the refractive index of an immersion oil for microscopy, the above-mentioned value is aimed at.

Further, as to viscosity, it is required to be the value of 100 to 50,000 centistokes at 37.8 C and, desirably, 1,000 to 10,000 centistokes at 37.8 C in view of circumstances to use it by sticking an immersion oil for microscopy to a glass rod or the like. Furthermore, as an immersion oil for microscopy, it is required to have a good value in every properties such as non-drying property, non-toxicity, fluorescence, appearance, weather resistance, corrosion resistance, contrast, resolving power, chromatic aberration and transparence.

Therefore, the use ratio of the two components used in this invention is determined to produce an immersion oil for microscopy suitable to the above-mentioned properties. Thereupon, when an immersion oil having large Abbe's number is required, the use ratio of chain hydrocarbon of the first component should be increased and, when an immersion oil having large refractive index is required, the use ratio of the second component of diphenylmethane derivatives and the like should be increased.

When the immersion oil for microscopy of this invention is produced, the first component of chain hydrocarbons and the second component of diphenylmethane derivatives or the like are heated in a vessel at 80 to 100 C to lower the viscosity of the mixture and thorough stirring and mixing should be conducted to blend the above-mentioned components homogeneously.

The immerision oil for microscopy in this invention has the advantage that the property of matter is not variable while it is used and it has not the toxicity affecting the human body compared with the usual immersion oil for microscopy. Furthermore, it has an excellent advantage that the properties such as Abbe's number and the like can easily be adjusted slightly.

The present invention is illustrated in further embodiment hereinbelow with reference to examples.

EXAMPLE 1

The two components comprising 500 g. of liquid polybutene, the product of Idemitsu petrochemical Co. Ltd: Idemitsu polybutene 100 H, having about 1000 of an average molecular weight as the first-component chain hydrocarbon having 200 to 5,000 of molecular weight and 215 g. of 1-phenyl-1-(3,4-dimethyl) phenylethane

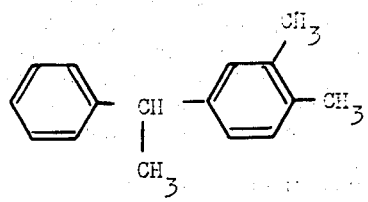

as the second-component diphenylmethane derivatives was fed to a vessel in a hot-air circulating type thermostat and, after substituting the air in the thermostat by nitrogen gas, the mixture was heated to 80 C and then blended with stirring for about 2 hours. Subsequently, after cooling the mixture to room temperature, it was filtered through a filter and a product was obtained. The values of various properties of the product obtained were determined and the results were shown in Table 1.

EXAMPLE 2

In the same manner as in Example 1, a product was produced except using 500 g. of liquid paraffin, product of Witoco Chemical Co. Ltd.: PENTOL, as the first-component chain hydrocarbon, and -methylbenzyl) g. of 1,2-bis (α-methylbenzyl -4,5-dimethylbenzene

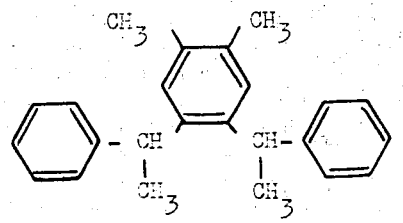

as the second-component bis (α-alkylbenzyl) alkylbenzene derivatives. The values of various properties of the product obtained were determined and the results were shown in Table 1.

EXAMPLE 3

In the same manner as in Example 1, a product was produced except using 500 g. of liquid polybutene, the product of Idemitsu petrochemcial Co., Ltd.: Idemitsu polybutene 300 H, having about 1,400 of an average molecular weight as the first-component chain hydrocarbon and 220 g. of 2,4-diphenyl-4-(3,4-dimethylphenyl)-butane

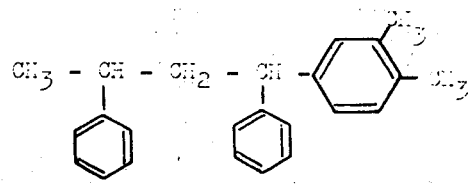

as the second component. The values of various properties of the product obtained were determined and the results were shown in Table 1.

COMPARATIVE EXAMPLE

For the purpose of comparing with the product of this invention, the values of various properties of Cedar oil and Cargille oil, usual immersion oil for microscopy, were determined and the results were shown in Table 1.

Table 1

| Immersion oil for microscopy | Example 1 | Example 2 | Example 3 | Comparative example | |
|---|---|---|---|---|---|
| | | | | Cedar oil | Cargille oil |
| Refractive index (25°C) | 1.515 | 1.515 | 1.515 | 1.515 | 1.515 |
| Abbe's number (25°C) | 43 | 46 | 44 | 47 | 44 |
| Viscosity (37.8°C) (Centistokes) | 730 | 200 | 3,100 | 1,200 | 1,300 |
| Non-drying property | 0 | 0 | 0 | × | 0 |
| Non-toxicity | 0 | 0 | 0 | 0 | × |
| Fluorescence | 0 | 0 | 0 | Δ | 0 |
| Appearance | 0 | 0 | 0 | 0 | 0 |
| Weather resistance | 0 | 0 | 0 | Δ | 0 |
| Corrosion resistance | 0 | 0 | 0 | 0 | 0 |
| Contrast | 0 | 0 | 0 | 0 | 0 |
| Resolving | 0 | 0 | 0 | 0 | 0 |

Table 1-continued

| Immersion oil for microscopy | Example 1 | Example 2 | Example 3 | Comparative example | |
|---|---|---|---|---|---|
| | | | | Cedar oil | Cargille oil |
| power Chromatic aberration | 0 | 0 | 0 | 0 | 0 |
| Transparency | 0 | 0 | 0 | 0 | 0 |

0 designates good
△ designates fair
× designates bad

What we claim is:

1. An immersion oil for microscopy which comprises 10 to 90 parts by weight of chain hydrocarbon having 200 to 5,000 of molecular weight and 10 to 90 parts by weight of at least one compound selected from the compounds of the following general formula (1), (2), (3):

(1) 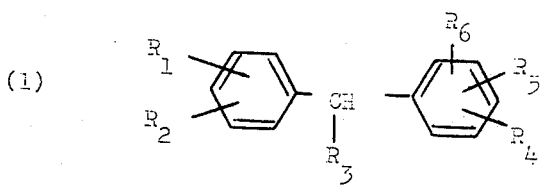

where $R_1$ to $R_5$ are hydrogen or alkyl group having from 1 to 2 carbon atoms and $R_6$ is hydrogen or alkyl group having from 1 to 4 carbon atoms and the total carbon number of $R_1$ to $R_6$ is from 0 to 5; and (2) 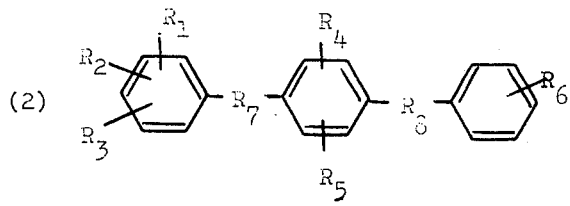

where $R_1$ to $R_3$ are hydrogen or alkyl group having from 1 to 4 carbon atoms and the total carbon number of $R_1$ to $R_3$ is from 0 to 4 and $R_4$ to $R_6$ are hydrogen or methyl group and $R_7$ to $R_8$ are alkylene group having from 1 to 3 carbon atoms or methylene group; and, (3) 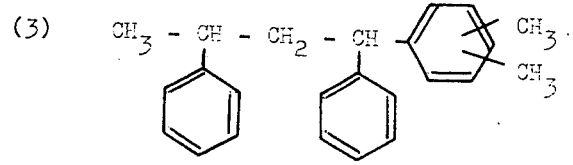

2. An immersion oil as claimed in claim 1, wherein the chain hydrocarbon having 200 to 5,000 of molecular weight is selected from the group consisting of liquid paraffin, liquid polybutene, liquid polyisobutylene, liquid polypropylene and the mixtures of the above-mentioned compounds.

3. An immersion oil as claimed in claim 1, wherein the compounds represented with the general formula (1) is selected from the group consisting of diphenylmethane, 1-phenyl-1-p-tolylethane, 1-phenyl-1-(3,4-dimethyl) phenylethane and the various isomers of the above-mentioned compounds.

4. An immersion oil as claimed in claim 1, wherein the compounds represented with the general formula (2) is selected from the group consisting of 1,3-bis(α-methylbenzyl) toluene, 1-2-bis(α-methylbenzyl)-)-4,5-dimethylbenzene, 1-α-methylbenzyl)-3-α'-methyl-(3,4-dimethylbenzyl)-4,5-dimethylbenzene and the various isomers of the above-mentioned compounds.

5. An immersion oil as claimed in claim 1, wherein the compounds represented with the general formula (3) is selected from the group consisting of 2,4-diphenyl-4-(3,4-dimethylphenyl) butane and their isomers.

* * * * *